(12) United States Patent
Kirby

(10) Patent No.: US 11,885,772 B2
(45) Date of Patent: Jan. 30, 2024

(54) MATERIAL TESTING SYSTEMS HAVING THREE PHASE SWITCHED-MODE POWER SUPPLY UNITS

(71) Applicant: Illinois Tool Works Inc., Glenview, IL (US)

(72) Inventor: Andrew Kirby, High Wycombe (GB)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/484,998

(22) Filed: Sep. 24, 2021

(65) Prior Publication Data

US 2022/0107247 A1    Apr. 7, 2022

(30) Foreign Application Priority Data

Oct. 5, 2020   (GB) ...................................... 2015769
Sep. 16, 2021  (EP) .................................... 21197059

(51) Int. Cl.
*G01N 3/02*   (2006.01)
*G01N 3/08*   (2006.01)
*G01N 3/00*   (2006.01)

(52) U.S. Cl.
CPC ....... *G01N 3/02* (2013.01); *G01N 2203/0411* (2013.01)

(58) Field of Classification Search
CPC ............. G01N 3/02; G01N 2203/0411; G01N 2203/0005; G01N 2203/0423;

(Continued)

(56) References Cited

U.S. PATENT DOCUMENTS

| 5,055,648 A | 10/1991 | Iceland |
| 2012/0169119 A1 | 7/2012 | Kunow |

(Continued)

FOREIGN PATENT DOCUMENTS

| CN | 107634669 A | 1/2018 |
| CN | 208353235 U | 1/2019 |

(Continued)

OTHER PUBLICATIONS

Search Report for GB2015769.9 dated Feb. 17, 2021 (3 pages).
European Office Communication with extended European Search Report Appln No. 21197059.5 dated Feb. 14, 2022.

*Primary Examiner* — Brandi N Hopkins
(74) *Attorney, Agent, or Firm* — McAndrews, Held & Malloy, Ltd.

(57) ABSTRACT

Disclosed example material testing systems include: a material testing apparatus configured to receive an electrical supply, wherein the material testing apparatus comprises: guide means; sample holding means configured for holding a sample; force means configured for applying force to the sample; and a crosshead arranged to support at least a portion of one or both of the sample holding means and the force means, wherein the crosshead is moveable about the guide means; a three phase switched-mode power supply unit arranged to provide the electrical supply to the material testing apparatus; and one or more blocking means connected with a power output of the three phase switched-mode power supply unit, wherein the blocking means is arranged to prevent an electrical current at the power output of the three phase switched-mode power supply unit from flowing in a predetermined direction.

13 Claims, 3 Drawing Sheets

(58) Field of Classification Search
CPC ............ G01N 19/00; G01N 3/00; G01N 3/38; G01N 3/06; G01N 25/20; G01R 31/2874; G01R 22/066; G01L 3/22
See application file for complete search history.

(56) References Cited

U.S. PATENT DOCUMENTS

| | | |
|---|---|---|
| 2013/0063070 A1 | 3/2013 | Zhang et al. |
| 2014/0354193 A1 | 12/2014 | Nakanishi |
| 2016/0164423 A1 | 6/2016 | Lidström |
| 2016/0274142 A1 | 9/2016 | White |
| 2016/0285384 A1 | 9/2016 | Youssef |
| 2020/0173893 A1* | 6/2020 | Peterson ................ G01N 3/08 |
| 2020/0173895 A1* | 6/2020 | Pope ..................... G01N 3/06 |
| 2023/0006960 A1* | 1/2023 | Clediere ................ H04L 51/52 |

FOREIGN PATENT DOCUMENTS

| | | |
|---|---|---|
| CN | 110044735 A | 7/2019 |
| JP | 2009075064 A | 4/2009 |
| JP | 2009128171 | 6/2009 |
| JP | 2009222654 | 10/2009 |
| JP | 2013120069 A | 6/2013 |
| WO | 2008133187 A1 | 11/2008 |

\* cited by examiner

MATERIAL TESTING SYSTEMS HAVING THREE PHASE SWITCHED-MODE POWER SUPPLY UNITS

RELATED APPLICATIONS

The present application claims the benefit of United Kingdom (GB) Patent Application No. 2015769.9, filed Oct. 5, 2020, and of European Patent Application No. 21197059.5, filed Sep. 16, 2021. The entireties of United Kingdom (GB) Patent Application No. 2015769.9 and European Patent Application No. 21197059.5 are expressly incorporated herein by reference.

FIELD OF INVENTION

The present invention relates to a material testing system and more particularly to a power supply unit and material testing apparatus within a material testing system.

BACKGROUND

Material testing apparatuses (also sometimes known as structural tests machines) are used to test the physical characteristics of a material sample. Material testing machines use a sample holder to hold the material sample and a force means to apply a force, via the sample holder, to test the physical characteristics of the material sample. Force means within material testing apparatuses may be actuated using a motor drive system that receives power from a power supply unit.

However, as new materials and new uses for materials are developed, the need for more rigorous testing has increased. The output power from a conventional power supply unit may not be sufficiently high for such testing. Therefore, the need for a higher power supply for motor drive systems exists.

A device is required that provides a high power motor drive system with a sufficient amount of power for acceptable performance whilst mitigating against variable input voltages and minimising inrush currents.

SUMMARY OF THE INVENTION

In accordance with the present inventions there is provided a material testing system, comprising: a material testing apparatus configured to receive an electrical supply, wherein the material testing apparatus comprises: guide means; sample holding means configured for holding a sample; force means configured for applying force to the sample; a crosshead arranged to support at least a portion of one or both of the sample holding means and the force means, wherein the crosshead is moveable about the guide means; wherein the material testing system comprises a three phase switched-mode power supply unit arranged to provide the electrical supply to the material testing apparatus.

Optionally, one or more blocking means may be connected with a power output of the three phase switched-mode power supply unit, wherein the blocking means may be arranged to prevent an electrical current from flowing in a predetermined direction.

In some embodiments, the one or more blocking means may comprise at least one power diode, wherein the at least one power diode may be connected in series with the power output of the three phase switched-mode power supply unit.

Optionally, the system may comprise a power factor correction means connected to the three phase switched-mode power supply unit.

In some embodiments, the power factor correction means may comprise a power factor correction circuit configured to perform active power factor correction.

Optionally, the three phase switched-mode power supply unit may comprise a starting circuit configured to, when the three phase switched-mode power supply unit is activated, allow a current and a voltage of the three phase switched-mode power supply unit to increase to an operational current value and an operational voltage value, respectively, over a predetermined period of time.

Optionally, the three phase switched-mode power supply unit may comprise a power fail detection circuit configured to output an indication of the power output by the three phase switched-mode power supply unit being outside an operational power value range.

Optionally, the three phase switched-mode power supply unit may be configured to receive an input voltage of 50-700 volts.

Optionally, the three phase switched-mode power supply unit comprises an input configuration comprising three live phase paths.

Optionally, the material testing apparatus may comprise: at least one motor drive system configured to operate at least one of the sample holding means, force means, and the crosshead.

In some embodiments, the at least one motor drive system may comprise at least one brushless motor drive.

Optionally, the sample holding means are configured to be actuated mechanically and/or pneumatically.

Optionally, the force means are configured to generate one or more of an axial force and a torsional force.

Optionally, the crosshead is movable about the guide means and comprises clamping means configured to apply a releasable clamping force to the guide means to secure the crosshead at a location with respect to the guide means.

According the an embodiment of the present invention, there is provided a three phase switched-mode power supply unit configured for use in a system according to any system above.

According to an embodiment of the present invention, there is provided a material testing apparatus configured to be used in a system according to any system above.

BRIEF DESCRIPTION OF THE DRAWINGS

One or more examples will now be described, by way of example only, with reference to the accompanying drawings, in which.

DETAILED DESCRIPTION

Typically, a problem of providing a higher power supply for a motor drive system is solved by generating the required power using a bridge rectifier acting directly on AC mains power. Such a set up carries a number of disadvantages. Firstly, variations in voltage supply are seen directly by the motor drive and may be transmitted as noise in the performance of the machine. Secondly, a bridge rectifier leads to an exceptionally poor power factor, providing distortion on a power network, which may increase costs from a power supplier. Costs may further be increased due to attempts to improve a power factor including uprating all wiring, terminals, and connectors of a facility and installing large passive factor correction means (e.g. large capacitors). The fact that 3 phase power may vary from country to country further increases costs due to manufacturing a required variant for each differing 3 phase power supply. Further, to cope with variation in supply voltage, a transformer is required to step-up or step-down the voltage to a known, fixed level that is suitable for the system. A transformer would have to be manually wired to the correct local supply voltages and currents, introducing the possibility of errors; are prone to noise and harmonics in voltage and current waveforms; and require a large inrush current when activated which means that power feeds have to be able to cope with an inrush current of up to a factor of 50 of the operating current of the device. In order to deal with such downfalls, a system may require inclusion of large chokes, filters and/or other such components to meet regulatory requirements. Further, a transformer for a high power motor drive system would be very large, heavy, and expensive, making it unfavourable to use in an appliance. Embodiments of the present invention aim to mitigate at least some of the above problems.

Figure 1:
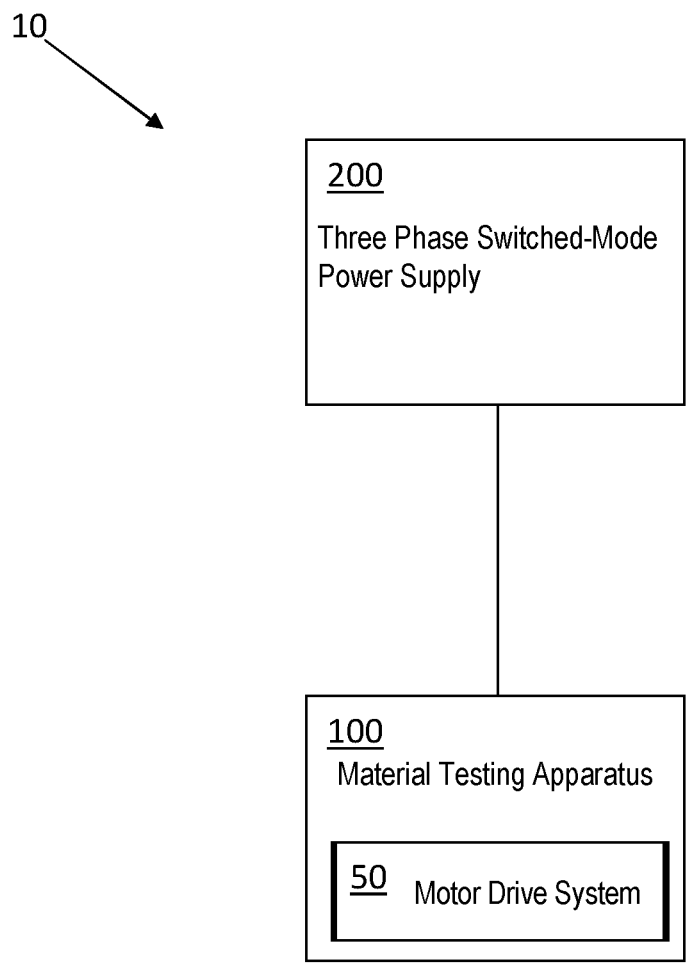
FIG. 1 illustrates an example of a system according to an embodiment of the present invention.

FIG. 1 illustrates a material testing system according to an embodiment of the present invention, indicated generally by the reference numeral 10. The material testing system comprises a three phase switched-mode power supply unit 200 and a material testing apparatus 100. The material testing apparatus 100 is configured to receive an electrical supply and the three phase switched-mode power supply unit 200 is arranged to provide the electrical supply to the material testing apparatus 100. In some embodiments, the material testing system may comprise more than one three phase switched-mode power supply unit 200 and/or more than one material testing apparatus 200. The three phase switched-mode power supply unit 200 will be discussed in more detail in relation to FIG. 2. The material testing apparatus 100 will be discussed in more detail in relation to FIG. 3. The three phase switched-mode power supply unit 200 and the material testing apparatus 100 may be electrically connected directly to each other. In some embodiments, auxiliary components may be included in the material testing system 10 and may be electrically connected to the three phase switched-mode power supply unit 200 and/or the material testing apparatus 100. In some embodiments, the auxiliary components may include at least one user interface means, a control module, and/or a communication module. Furthermore, it will be appreciated that other auxiliary components may be included in the material testing system 10.

In some embodiments, the material testing system 10 may comprise a user interface means as an auxiliary component. The user interface means may be configured to enable a user to control the constituent components of the material testing system 10. For example, initiating the material testing apparatus 100 to begin testing a sample. In some embodiments, the user interface means may be included in the material testing system 10 and may be configured to display data related to the testing of a sample that is being tested by the material testing system 10. However, it will be appreciated that the user interface means may be configured to perform other operations.

In some embodiments, the material testing system 10 may comprise a control module as an auxiliary component. The control module may be configured to control the operation of the constituent components of the material testing system 10. The control module may be configured to receive a signal representative of a user input from the user interface and transmit as signal that corresponds to the user input to a corresponding constituent component. However, it will be appreciated that the control module may be configured to perform other operations.

In some embodiments, the material testing system 10 may comprise a communication module as an auxiliary component. The communication module may be configured to communicate with another constituent component of the material testing system 10. The communication module may be configured to communicate with an electronic device outside of the material testing system 10. For example, the communication module may output testing result data for a sample to a personal electronic device (e.g. a PC or a printer) that a user may be stationed at. However, it will be appreciated that the communication module may be configured to perform other operations.

In some embodiments, the auxiliary components may be included in the material testing apparatus 100 and/or the three phase switched-mode power supply 200.

In some embodiments, material testing system 10 may be formed within a single housing so as to house all constituent components in a single housing. In other embodiments, the material testing system 10 may be located within multiple housings i.e. each having a respective housing in some embodiments so as to house all constituent components. However, it will be appreciated that other arrangements thereof may be included in material testing system 10.

Figure 2:
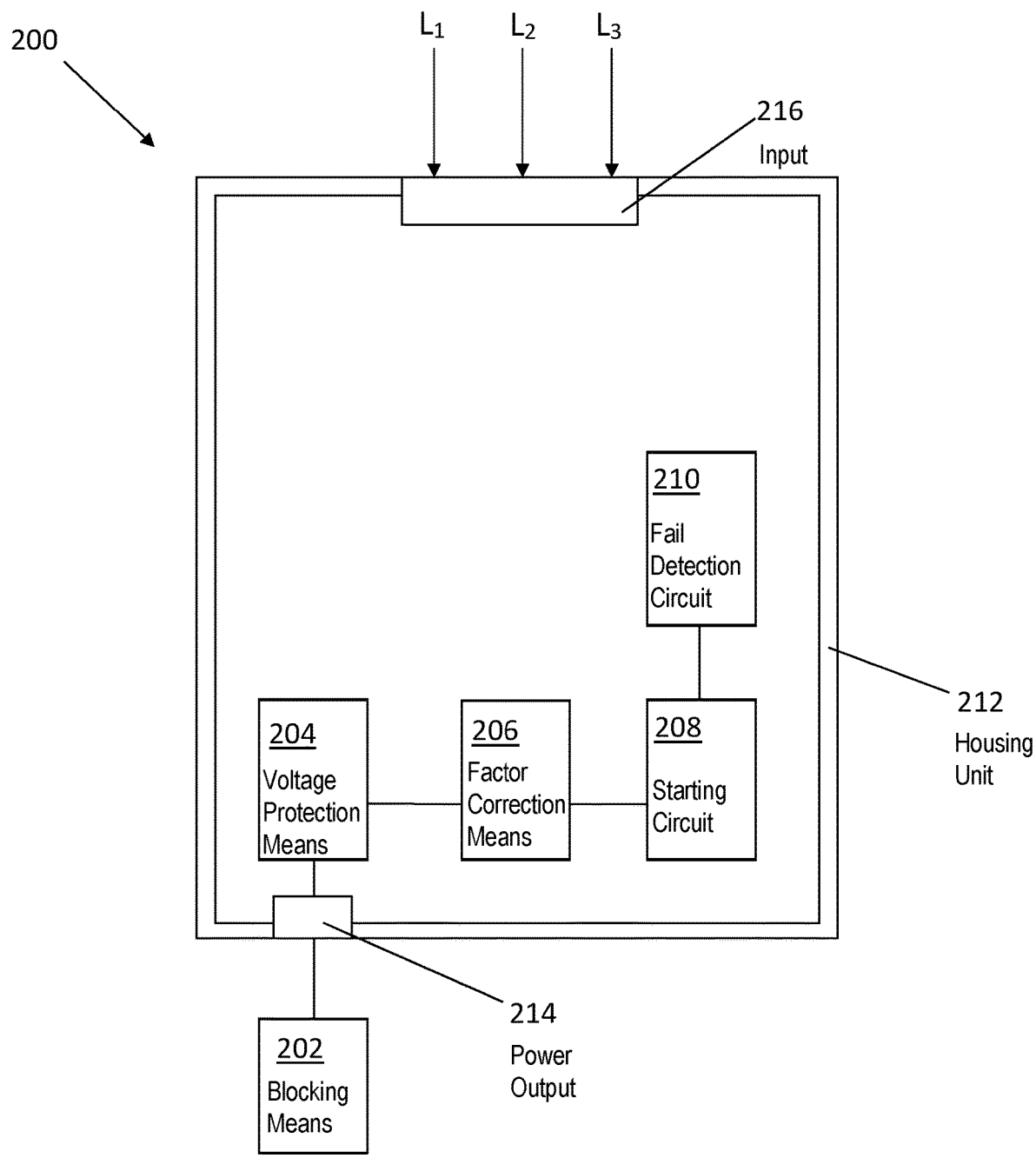
FIG. 2 illustrates a three phase switched-mode power supply unit according to an embodiment of the present invention.

FIG. 2 illustrates a three phase switched-mode power supply unit according to an embodiment of the present invention, indicated generally by reference numeral 200. Advantageously, using a three phase switched-mode power supply unit allows the material testing system 10 to operate on a wide range of input voltages without adjustment or re-configuration and therefore the system 10 may be used in many countries around the world with different power supply voltages, without a different variant of the material testing system 10 for each different country. In some embodiments, the three phase switched-mode power supply 200 unit may be configured to receive an input voltage of 50-700 volts. In some embodiments, the three phase switched-mode power supply unit 200 may be configured to receive an input voltage of 130-600 volts. In some embodiments, the three phase switched-mode power supply unit 200 may be configured to receive an input voltage of 180-480 volts. Further, the use of the three phase switched-mode power supply 200 may eliminate the need for large chokes, filters and/or other such components in the material testing system 10.

The three phase switched-mode power supply unit 200 may be a three phase switched-mode power supply unit, generally referred to as "3P", including three live phase paths and not including a fourth, neutral path. The three phase switched-mode power supply unit 200 may be a three phase switched-mode power supply unit, generally referred to as "3P+N", including three live phase paths and a fourth, neutral path. In some embodiments, the three phase switched-mode power supply unit 200 may be configured in the "3P" configuration. Advantageously, due to neutral paths not being widespread among installation spaces (laboratory or industrial space, as non-limiting examples) of the material testing system 10, using a "3P" configuration may allow the materials testing system 10, including the three phase switched-mode power supply unit 200, to be installed in a larger number of installation spaces without adaptation of the power supplies thereof. The three phase switched-mode power supply unit is arranged to receive at an input 216 a three phase AC power (denoted as $L_1$, $L_2$, and $L_3$ in FIG. 2), for example from the mains utility power grid, and output a DC power having a predetermined voltage. In the context of the present invention, the three phase switched-mode power supply unit 200 may be required to receive a three phase AC power, transform the received three phase AC power into a constant DC output, and supply the constant DC output to the material testing apparatus 100 such that the material testing apparatus is able to accurately test properties of a chosen sample. For example, in FIG. 1, the line connecting the three phase switched-mode power supply unit 200 to the material testing apparatus 100 may be carrying a DC power supply. In some embodiments, the constant DC output of the three phase switched-mode power supply unit 200 may be input to at least one motor drive system 50 of the material testing apparatus 100. The at least one motor drive system 50 may convert the received DC input into an AC power that may be supplied to at least one motor comprised within the materials testing apparatus 100.

The three phase switched-mode power supply unit 200 may be formed of a single housing in some embodiments. In some embodiments, the three phase switched-power supply unit 200 may comprise at least one output terminal 214. In some embodiments, the three phase switched-mode power supply unit 200 may be formed of two or more housings. In some embodiments, the three phase switched-mode power supply unit 200 may comprise one or more of the three phase switched-mode power supply units disclosed herein. In some embodiments, the three phase switched-mode power supply unit 200 may comprise at least one of: diodes, thyristors, transistors, or converters. The three phase switched-mode power supply unit 200 may comprise at least one of: half-wave, full-wave, uncontrolled, and fully-controlled circuits arranged to transform the AC input to a DC output. In some embodiments, the three phase switched-mode power supply unit 200 may also comprise one or more of: at least one blocking means 202, at least one over voltage protection means 204, at least one power factor correction means 206, at least one starting circuit 208, and at least one power fail detection circuit 210. In some embodiments, one or more of the at least one of a blocking means 202, at least one over voltage protection means 204, at least one power factor correction means 206, at least one starting circuit 208, and at least one power fail detection circuit 210 may be electrically connected inside a three phase switched-mode power supply unit housing 212 or externally to an output terminal of the three phase switched-mode power supply unit 200. In FIG. 2, the at least one blocking means 202 is illustrated as being electrically connected, in series, externally to a power output 214 of the three phase switched-mode power supply unit and the one or more of at least one: an over voltage protection means 204, a power factor correction means 206, a starting circuit 208, and a power fail detection circuit 210, are illustrated as being electrically connected inside a housing 212 of the three phase switched-mode power supply unit 200. However, it will be appreciated that other components and arrangements thereof may be included in the three phase switched-mode power supply unit 200. For example, the three phase switched-mode power supply unit 200 may comprise an output regulation circuit arranged to regulate the output of the three phase switched-mode power supply unit 200 so that the output voltage and/or output current is advantageously independent of any variation of input (i.e. if there are variances in an AC input, the material testing system 10 is unaffected). As a further example, the three phase switched-mode power supply unit 200 may comprise a "soft start" function that allows the three phase switched-mode power supply unit 200 to start up and minimise a sudden "inrush" current, thereby limiting the problems for an energy source or supply that may be caused by a high inrush current. Generally, implementing such a function in a non-switched-mode power supply unit configuration may be difficult and add significant size and expense to design and therefore the advantages of the present invention may be further appreciated.

The at least one over voltage protection means 204 may be configured to activate when the voltage of the three phase switched-mode power supply unit 200 exceeds a predetermined level. The over voltage protection means 204 may be an over voltage protection circuit, over voltage protection device or an over voltage protection module. In some embodiments, when activated, the over voltage protection means 204 are configured to reduce the excess voltage using discrete components, integrated circuits, and/or mechanical devices. However, it will be appreciated that other components and arrangements thereof may be included in the over voltage protection means 204. In some embodiments, when activated, the over voltage protection means 204 may be configured to shut down the three phase switched-mode power supply unit 200 to protect the material testing apparatus 100. In some embodiments, when activated, the over voltage protection means 204 may also be configured to prevent the three phase switched-mode power supply unit 200 outputting electrical power. In some embodiments, when the over voltage protection means 204 are activated, the three phase switched-mode power supply unit 200 may output an error code to a user interface of the material testing system. In some embodiments, when the over voltage protection means 204 are activated, the three phase switched mode power supply unit 200 may output an error code to an indicator included in the three phase switched-mode power supply unit 200.

The at least one blocking means 202 may be connected with an output 214 of the three phase switched-mode power supply unit 200. The blocking means 202 may be a blocking circuit, blocking device, or a blocking module. During operation of the materials testing system 10, the three phase switched-mode power supply unit 200 is required to output an electrical current, to the at least one motor drive system included in the material testing apparatus 100, for a short period of time and then be required to output zero current (e.g. the current demand may have a square profile). For example, such a current demand profile may be encountered when supplying power to the force means 140 to exert a maximum force on the sample 130 for a period of time and then deactivate. In such a situation, a regeneration energy, produced due to the motor coupling through the at least one respective motor drive system, may cause current to flow back from the material testing apparatus 100 into the three phase switched-mode power supply unit 200. In some embodiments, when the regeneration energy occurs, the voltage of the three phase switched-mode power supply unit 200 may increase due to the back flow current. In some embodiments, the voltage of the three phase switched-mode power supply unit 200 may increase above a predetermined level and trigger the over voltage protection means 204 and cause the three phase switched-mode power supply unit 200 to shut down or clamp off the excess voltage. In some embodiments, the at least one blocking means 202 may be connected to a power output 214 of the three phase switched-mode power supply unit 200 to prevent the regeneration flowing into the three phase switched-mode power supply unit 200, potentially activating the over voltage protection means 204. The blocking means 202 may prevent an electrical current from flowing in a chosen direction. In some embodiments, the at least one blocking means 202 may comprise at least one power diode connected in series with the power output of the three phase switched-mode power supply unit 200 to prevent the regeneration flowing into the three phase switched-mode power supply unit 200. In some embodiments, the at least one blocking means 202 may be used in combination with at least one or more capacitor to prevent the regeneration current flowing into the three phase switched-mode power supply unit 200. Advantageously by preventing the regeneration current from flowing into the three phase switched-mode power supply unit 200, it may be possible to prevent the three phase switched-mode power supply unit 200 from damaging components and/or triggering the over voltage protection means 204 when regeneration energy is produced during operation of the material testing apparatus 100.

The power factor correction means 206 may be configured to increase the amount of useful power provided by the three phase switched-mode power supply unit 200. The power factor correction means 206 may be a power factor correction circuit, power factor correction device or a power factor correction module. The power factor correction means 206 may improve phase alignment of the output voltage and output current of the three phase switched-mode power supply unit 200. In some embodiments, the power correction means 206 may comprise a power correction circuit configured to perform active power factor correction. In some embodiments, the power correction circuit configured to perform active power factor correction may comprise one or more of at least one control circuit, at least one diode, at least one filter, at least one resistor, at least one capacitor, and at least one inductor. However, it will be appreciated that other components and arrangements thereof may be included in the power correction means 206. Advantageously, by using power correction means 206 configured to perform active power factor correction, an incoming voltage may be boosted so that the material testing system 10 may operate with a wide range of input voltages without adaptation to its design, nor require multiple variants in constituent transformers or wiring schemes. The active power factor correction may make very efficient use of an electricity supply meaning that a larger material testing system 10 may be installed and operated from a smaller power socket.

The starting circuit 208 may be configured to mitigate large inrush currents when activating the three phase switched-mode power supply unit 200 from a lower power state such as a completely deactivated state. When being activated from a deactivated state, some components may require an initial current many times the current that is drawn whilst the components operate at full power. For example, if the three phase switched-mode power supply unit 200 comprises a large capacitor, when the three phase switched-mode power supply unit 200 is in a deactivated state, the large capacitor may be substantially or completely discharged. Therefore, upon activating the three phase switched-mode power supply unit 200, the large capacitor may behave or appear as a short circuit for a brief period of time, until the charge begins to build within the large capacitor, requiring a large inrush current and potentially causing damage to components within the three phase switched-mode power supply unit 200 and materials testing system 10. In some embodiments, the starting circuit 208 may be configured to, when the three phase switched-mode power supply unit 200 is activated, allow a current and a voltage of the three phase switched-mode power supply unit 200 to increase to an operational current value and an operational voltage value, respectively, over a period of time. The period of time may be longer than the time period for a conventional power-up time period when activating the three phase switched-mode power supply unit 200 without the starting circuit 208. Advantageously, by controlling the activation of the three phase switched-mode power supply unit 200 and gradually increasing the current and voltage of the three phase switched-mode power supply 200 over a time period, the starting circuit 208 may allow an inrush current to be limited to a safe value and therefore protect the components included in the three phase switched-mode power supply unit 200 and the material testing system 10. In some embodiments, this process may be labelled as a "soft" start.

In some embodiments, the inrush current may be limited by a starting circuit 208 configured to introduce a resistance into the constituent circuits of the three phase switched-mode power supply unit 200. In some embodiments, the starting circuit 208 may introduce a resistance for a predetermined time period. In some embodiments, the starting circuit 208 may monitor voltage build-up on components that are chosen to be detected and introduce a resistor until the measured voltage build-up is equal to an operational voltage build-up level. In some embodiments, the starting circuit 208 may be connected with a user interface means, included in the materials testing system 10, that is configured to output, such as to a display, an alert to a user of a voltage build-up level and enable the user to control the starting circuit 208 through the user interface means. However, it will be appreciated that other components and arrangements thereof may be included in the starting circuit 208.

The power fail detection circuit 210 may be configured to monitor a power output by the switched-mode power supply unit 200. The three phase switched-mode power supply unit 200 may be configured to provide power of a prespecified value of a power and a high voltage direct current. As a non-limiting example, the three phase switched-mode power supply unit 200 may be rated to provide a power of up to 20 kW with a voltage of 300-400 VDC. A fault may arise in a component of the three phase switched-mode power supply unit 200 and the three phase switched-mode power supply unit 200 may not, by virtue of the fault, be able to supply a required operational power or voltage to the material testing apparatus 100. In some embodiments, the power fail detection circuit 210 may be configured to output an indication of the power output by the three phase switched-mode power supply unit 200 being outside an operational power value range. In some embodiments, the power fail detection circuit 210 may output the indication as a power failure indication, wherein the power failure indication is output to a user interface of the material testing system. The power fail detection circuit 210 may further display a power failure indication on the three phase switched-mode power supply unit 200. However, it will be appreciated that other components and arrangements thereof may be included in the power fail detection circuit 210.

Figure 3:
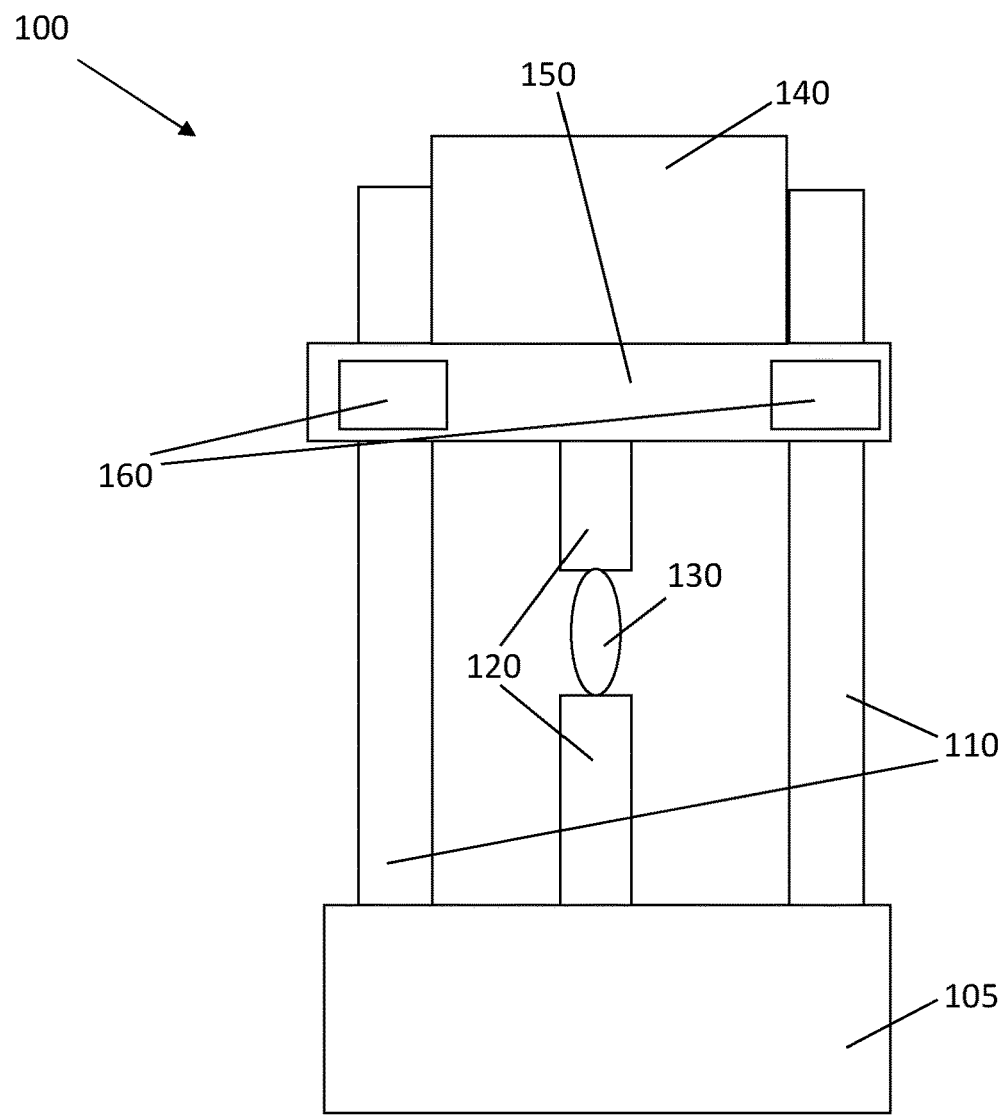
FIG. 3 illustrates a materials testing apparatus according to an embodiment of the present invention.

FIG. 3 illustrates a material testing apparatus according to an embodiment of the present invention, indicated generally by reference numeral 100. The material testing apparatus comprises a guide means 110, a sample holding means 120, a force means 140 and a crosshead 150.

The material testing apparatus 100 is configured to receive an electrical supply provided by the three phase switched-mode power supply unit 200. In some embodiments the material testing apparatus 100 may comprise at least one motor drive system 50 (FIG. 1) that is arranged to receive, as input, the electrical supply from the three phase switched-mode power supply unit 200. In some embodiments, the at least one motor drive system may be housed externally to the material testing apparatus 100 or may be housed within the material testing apparatus 100. In some embodiments, the at least one motor drive system is configured to operate at least one of the sample holding means 120, force means 140, and the crosshead 150. In some embodiments, the at least one motor drive system may be configured to receive the DC output from the three phase switched-mode power supply unit 200, as input, and supply an AC power to at least one motor comprised within the material testing apparatus 100 to facilitate the actuation thereof. In some embodiments, the at least one motor may be comprised within at least one of the sample holding means 120, force means 140, and the crosshead 150 to facilitate actuation thereof. In some embodiments, the at least one motor drive system may comprise at least one brushless motor drive. In some embodiments, the at least one motor drive system may be at least one respective motor drive system configured to operate at least one of the sample holding means 120, force means 140, and the crosshead 150. In some embodiments, at least one of the sample holding means 120, force means 140, and the crosshead 150 may each comprise at least one respective motor drive system.

The guide means 110 may be a guide arranged to support the crosshead 150 and guide a movement of the crosshead 150 about the guide 110. The crosshead 150 may be secured about the guide 110. The guide 110 may be supported by a base 105 of the material testing apparatus 100. In the embodiment illustrated in FIG. 3, the guide 110 comprises two stanchions, laterally separated by less than a width of the crosshead 150, which extend vertically from the base 105. It will be appreciated that the guide 110 may be adapted according to force requirements and/or a shape and size of the material testing apparatus 100. For example, the guide 110 may comprise one stanchion. Each guide in the illustrated embodiment has a generally circular lateral cross-section although it will be appreciated that other cross-sectional shapes of the guide means may be envisaged.

The crosshead 150 is moveable about the guide 110. The crosshead 150 may be moveable about the guide 110 via translational movement. The movement of the crosshead 150 about the guide 110 may be referred to as a crosshead lift operation, in that the crosshead 150 is lifted to allow the sample 130 to be inserted or removed from the material testing apparatus 100 and to accommodate samples of different sizes to be tested. The movement of the crosshead 150 about the guide 110 enables a position of the sample holding means 120 to be adjusted in dependence on the size of the sample 130. In the embodiment in FIG. 3, the crosshead 150 is arranged to move along the two stanchions of the guide 110 using translational movement. The crosshead 150 is arranged to move in first and second opposed directions about the guide 110 which may be up and down directions along the guide 110. However, it will be appreciated that other configurations of the crosshead and guide will be envisaged. For example, the guide 110 may be arranged horizontally and the crosshead 150 may move left and right about the guide 110.

The crosshead 150 is arranged to support at least a portion of one or both of the sample holding means 120 and the force means 140. Advantageously, using the crosshead 150 as a support for other components of the material testing apparatus 100 results in a compact apparatus.

In the embodiment illustrated in FIG. 3, the force means 140 is supported by the crosshead 150 in that the force means 140 is located on the crosshead 150. Furthermore, an upper part of the sample holding means 120 is supported by the crosshead 150 in that the upper part is suspended below the crosshead 150. The crosshead 150 may be adapted according to force requirements and/or a shape and size of the material testing apparatus 100.

In some embodiments, crosshead 150 may comprise clamping means 160. The clamping means 160 may be configured to apply a releasable clamping force to the guide 110 to secure the crosshead 150 at a location with respect to the guide 110. The clamping means 160 may be a manual clamping apparatus. The clamping means 160, when manual, are configured to apply the releasable clamping force in correspondence with a user operation. That is, when manual, the clamping means 160 secures the crosshead 150 to the guide 110 with manual application of the clamping force from a user. In some embodiments, the clamping means 160 may comprise a handle, for applying the clamping force, for use during the user operation.

The clamping means 160 may be an automated clamping apparatus. As will be understood by the term "automated", an automated clamping means may be configured to automatically apply the releasable clamping force to the guide 110. That is, the automated clamping means secures the crosshead 150 to the guide 110 without manual application of the clamping force. In some embodiments, the crosshead 150 may comprise an actuator configured to facilitate applying the releasable clamping force to the guide. The crosshead 150 may comprise at least one motor to facilitate the actuation of the clamping means 160. In some embodiments, the at least one motor of the crosshead 150 may receive electrical power from at least one motor drive system to cause the clamping means 160 to be actuated. Advantageously, an automated clamping means enables a large clamping force to be applied to secure the crosshead 150 to the guide 110 without using a long handle which would be required if the clamping force was applied in dependence on a user operation. Therefore, the clamping of the crosshead 150 to the guide 110 is able to withstand a large amount of force caused by the force apparatus and/or sample 130 exerting force on the crosshead 150 during testing.

In some embodiments, in which the clamping means is automated, the clamping means 160 may be arranged to maintain the clamping force in an absence of electrical power provided to the clamping means 160. As a result, the crosshead 150 is secured to the guide 110 in an absence of electrical power provided to the clamping apparatus 160. Advantageously, the automated clamping means 160 is 'failsafe', meaning that the clamping means does not rely on a continuous supply of electrical power to maintain a clamped state.

As mentioned above, the material testing apparatus 100 comprises the sample holding means 120 and the force means 140. The sample holding means 120 is for holding a sample 130 to be tested. The sample holding means 120 may be a sample holding device arranged to grip the sample 130 and may be comprised of a plurality of members, such that the sample 130 is gripped when placed between members of the sample holding means 120. For example, the sample holding means 120 may comprise a plurality of grips, such as claws, each arranged at opposing ends of the sample 130. In some embodiments, there is a pair of grips. In some embodiments, the sample holding means 120 may be configured to be actuated mechanically and/or pneumatically. The sample holding means 120 may comprise at least one motor to facilitate the actuation of the sample holding means 120. In some embodiments, the at least one motor of the sample holding means 120 may receive electrical power from at least one motor drive system to cause the sample holding means 120 to be actuated.

The sample holding means 120 may be configured to withstand a maximum force to be applied to the sample by the material testing apparatus 100. As such, the sample holding means 120 may be structured and formed of a material such that the sample holding means 120 is not deformed by a force less than or equal to the maximum force to be applied to the sample 130. The sample holding means 120 may therefore be adapted according to force requirements and/or a shape and size of the sample 130 to be tested. The sampling holding means 120 may be arranged horizontally or vertically in dependence on a type and amount of force to be applied to the sample. However, it will be appreciated that other structures and forms of sample holding means will be envisaged.

The force means 140 is a force apparatus for applying force to the sample 130 to test physical properties of the sample 130. The force means 140 may repeatedly apply force to the sample. In some embodiments, the force means may be configured to apply one or more of an axial force and a torsional force. For example, the force apparatus 140 may apply a deformation or testing force to deform the sample 130, by one or more of stretching, compression or torsion. A further one or more of stretching, compression or torsion may be applied instead of or in addition to the deformation force. The force apparatus 140 may apply the force via the sample holding means 120 in that a force to be applied to the sample 130 is applied by moving the sample holding means 120. The force apparatus 140 may be arranged to apply the force to one end of the sample 130 or two opposing ends of the sample 130. The force apparatus 140 may be adapted according to force requirements and/or a shape and size of the material testing apparatus 100. For example, the force apparatus 140 may comprise an actuator. The actuator may be arranged to, in use, move at least one of the sample holding means 120 to apply force to the sample held therein. The force means 140 may comprise at least one motor to facilitate the actuation of the force means 140. In some embodiments, the at least one motor of the force means 140 may receive electrical power from at least one motor drive system to cause the force means 140 to be actuated. However, it will be appreciated that other force apparatuses to apply a force will be envisaged.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A material testing system, comprising:
a material testing apparatus configured to receive an electrical supply, wherein the material testing apparatus comprises:
guide means;
sample holding means configured for holding a sample;
force means configured for applying force to the sample; and
a crosshead arranged to support at least a portion of one or both of the sample holding means and the force means, wherein the crosshead is moveable about the guide means;
a three phase switched-mode power supply unit arranged to provide the electrical supply to the material testing apparatus; and
one or more blocking means connected with a power output of the three phase switched-mode power supply unit, wherein the blocking means is arranged to prevent an electrical current at the power output of the three phase switched-mode power supply unit from flowing in a predetermined direction.

2. The system of claim 1, where the one or more blocking means comprises at least one power diode, wherein the at least one power diode is connected in series with the power output of the three phase switched-mode power supply unit.

3. The system of claim 1, comprising a power factor correction means connected to the three phase switched-mode power supply unit.

4. The system of claim 3, wherein the power factor correction means comprises a power factor correction circuit configured to perform active power factor correction.

5. The system of claim 1, wherein the three phase switched-mode power supply unit comprises a starting circuit configured to, when the three phase switched-mode power supply unit is activated, allow a current and a voltage of the three phase switched-mode power supply unit to increase to an operational current value and an operational voltage value, respectively, over a predetermined period of time.

6. The system of claim 1, wherein the three phase switched-mode power supply unit comprises a power fail detection circuit configured to output an indication of the power output by the three phase switched-mode power supply unit being outside an operational power value range.

7. The system of claim 1, wherein the three phase switched-mode power supply unit is configured to receive an input voltage of 50-700 volts.

8. The system of claim 1, wherein the three phase switched-mode power supply unit comprises an input configuration comprising three live phase paths.

9. The system of claim 1, wherein the material testing apparatus comprises:
at least one motor drive system configured to operate at least one of the sample holding means, force means, and the crosshead.

10. The system of claim 9, wherein the at least one motor drive system comprises at least one brushless motor drive.

11. The system of claim 1, wherein the sample holding means are configured to be actuated mechanically and/or pneumatically.

12. The system of claim 1, wherein the crosshead is movable about the guide means and comprises clamping means configured to apply a releasable clamping force to the guide means to secure the crosshead at a location with respect to the guide means.

13. A material testing apparatus configured to receive an electrical supply, wherein the material testing apparatus comprises:
guide means;
sample holding means configured for holding a sample;
force means configured for applying force to the sample;
a crosshead arranged to support at least a portion of one or both of the sample holding means and the force means, wherein the crosshead is moveable about the guide means;
a three phase switched-mode power supply unit arranged to provide the electrical supply to the material testing apparatus from a power output of the three phase switched-mode power supply unit; and
one or more blocking means connected with the power output of the three phase switched-mode power supply unit, wherein the blocking means is arranged to prevent an electrical current at the power output of the three phase switched-mode power supply unit from flowing in a predetermined direction.

* * * * *